United States Patent
Mehta et al.

(10) Patent No.: US 12,493,463 B1
(45) Date of Patent: Dec. 9, 2025

(54) SYSTEM AND METHOD FOR MACHINE LEARNING DEVELOPMENT

(71) Applicant: Morgan Stanley Services Group Inc., New York, NY (US)

(72) Inventors: Mehak Mehta, Jersey City, NJ (US); Sanjit Vijay Mehta, Karnataka (IN); Rahul Suresh, Tamil Nadu (IN); Lokin Makkena, New York, NY (US); Ashish Kumar Singh, Karnataka (IN); Vijay Kumar Butte, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/270,932

(22) Filed: Jul. 16, 2025

(51) Int. Cl.
| | |
|---|---|
| *G06N 3/08* | (2023.01) |
| *G06F 8/70* | (2018.01) |
| *G06F 8/71* | (2018.01) |
| *G06F 8/77* | (2018.01) |
| *G06F 9/44* | (2018.01) |
| *G06N 20/00* | (2019.01) |
| *G06Q 30/02* | (2023.01) |

(52) U.S. Cl.
CPC .................... *G06F 8/71* (2013.01)

(58) Field of Classification Search
CPC ........ G06F 8/71; G06F 9/545; G06F 16/9024; G06F 8/75; G06F 9/5072; G06F 9/455; G06N 3/006; G06N 20/00; G06N 3/0475; H04L 67/10; H04L 67/566
See application file for complete search history.

(56) References Cited

U.S. PATENT DOCUMENTS

| | | | |
|---|---|---|---|
| 11,216,273 B1 * | 1/2022 | Story | G06F 9/45558 |
| 11,782,813 B2 * | 10/2023 | Zhou | G06N 3/08 |
| | | | 717/132 |
| 2020/0005219 A1 | 1/2020 | Steven | |
| 2022/0067034 A1 | 3/2022 | Daly | |
| 2022/0147635 A1 | 5/2022 | Copty et al. | |
| 2022/0326930 A1 | 10/2022 | Nandavar et al. | |
| 2023/0252107 A1 | 8/2023 | Hamamoto et al. | |
| 2023/0368074 A1 | 11/2023 | Kasaragod et al. | |
| 2023/0418577 A1 | 12/2023 | Chan et al. | |
| 2024/0134972 A1 | 4/2024 | Boue et al. | |
| 2024/0160724 A1 | 5/2024 | Shetty et al. | |
| 2024/0160953 A1 | 5/2024 | Manda et al. | |
| 2024/0210903 A1 | 6/2024 | Iordan et al. | |
| 2024/0273396 A1 | 8/2024 | Odibat et al. | |

* cited by examiner

*Primary Examiner* — Thuy Dao
(74) *Attorney, Agent, or Firm* — PEARL COHEN ZEDEK LATZER BARATZ LLP

(57) ABSTRACT

A system and method may create and manage a code repository structure and related files for a ML system such as a NN by executing code to create a version control management platform template commit including a pipeline folder comprising deploy files; a configuration folder comprising key-value pairs describing variables used as input to the neural network; a notebooks folder; a steps folder including ML or NN code; a tests folder comprising test scripts; and a utils folder; and executing code to create a tag associated with a pull request and alter version control management platform data such that the tag is displayed in conjunction with data describing the branch associated with the pull request. Executing code to create a tag may include searching a commit history for a unique commit number associated with a pull request, and based on this search creating a tag.

20 Claims, 9 Drawing Sheets

SYSTEM AND METHOD FOR MACHINE LEARNING DEVELOPMENT

FIELD OF THE INVENTION

The present invention relates generally to machine learning project development computer systems, and automatically managing such development.

BACKGROUND OF THE INVENTION

Computer systems and technologies exist to enable the development of computer software such as machine learning (ML) systems, including for example neural networks (NNs). MLOps is a paradigm used to develop ML models. MLOps is a compound of "machine learning" and the continuous integration/continuous delivery practice (CI/CD) of DevOps.

When using current MLOps systems developers may take a long time to create ML systems and bring them online, and such systems may not allow for parallel development and effective collaboration among different MLOps teams. Current systems may have high burdens when tracking and managing ML models during development.

SUMMARY OF THE INVENTION

A system and method may create and manage a code repository or development structure and related files for a ML system such as a NN by executing code to create a version control management platform template commit including: a pipeline folder comprising deploy files; a configuration folder comprising key-value pairs describing variables used as input to the neural network; a notebooks folder; a steps folder including ML or NN code; a tests folder comprising test scripts; and a utils folder. A system and method may execute code to create a tag associated with a pull request (PR) and alter version control management platform data such that the tag is displayed or otherwise used in conjunction with data describing the branch associated with the pull request. A system and method may include executing code to create version control management platform branches, the branches including for example a main branch; a develop branch branching from the main branch; a data science branch branching from the develop branch; a machine learning branch branching from the develop branch; and a quality assessment branch branching from the develop branch. Executing code to create a tag may include searching a commit history for a unique commit number associated with a pull request, and based on this search creating a tag. Upon the event of or in response to a commit, an embodiment may execute a process to validate files in one or more of the pipeline folder, configuration folder, notebooks folder, steps folder, a tests folder, and utils folder. The validation may include one or more of determining whether or not files in the relevant folder exist; determining whether or not certain functions are contained within files in a relevant folder; and determining whether or not a function within a file in a relevant folder has a correct signature.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
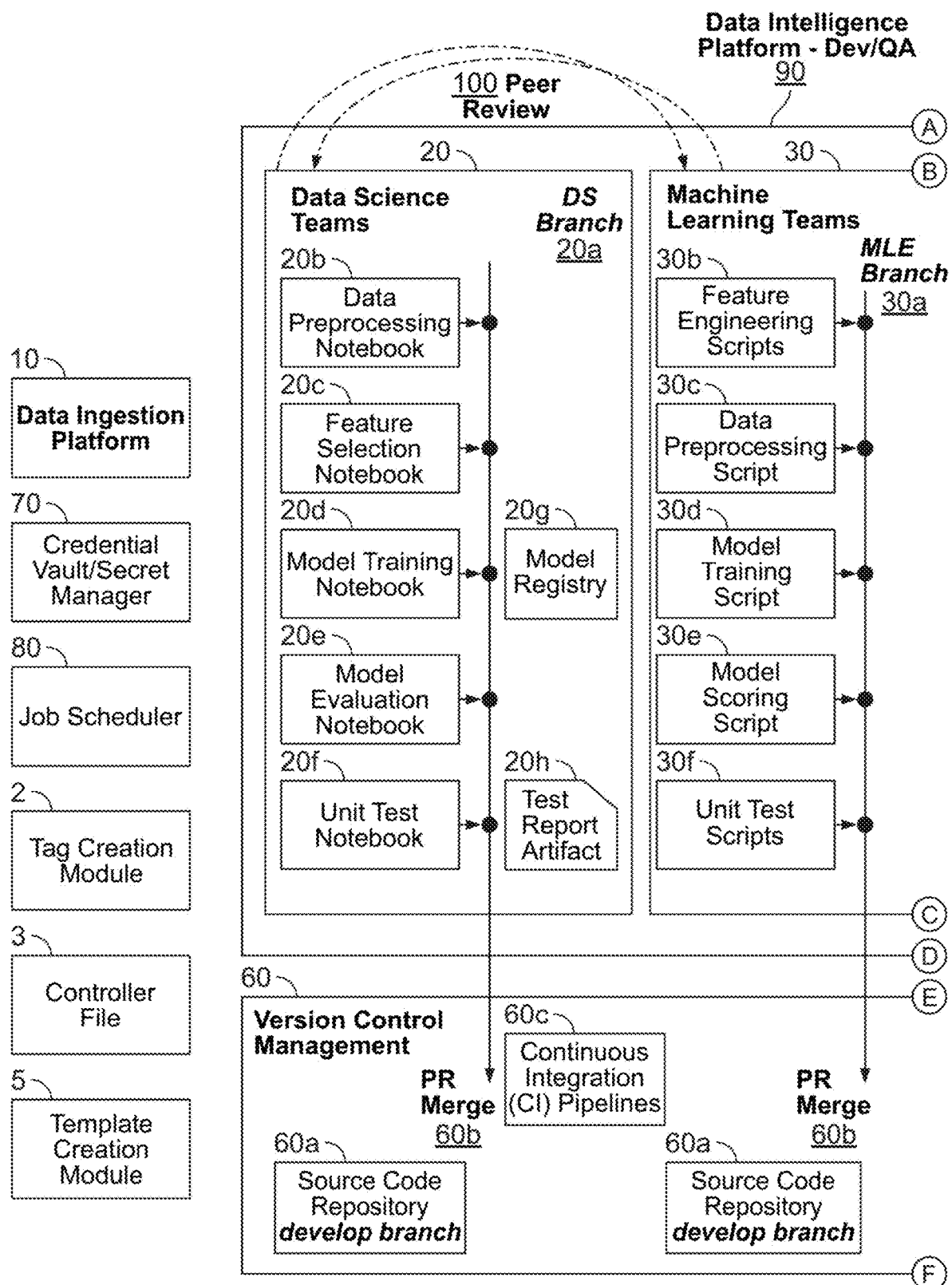
FIG. 1 depicts an ML development system according to embodiments of the present invention.
Figure 1:
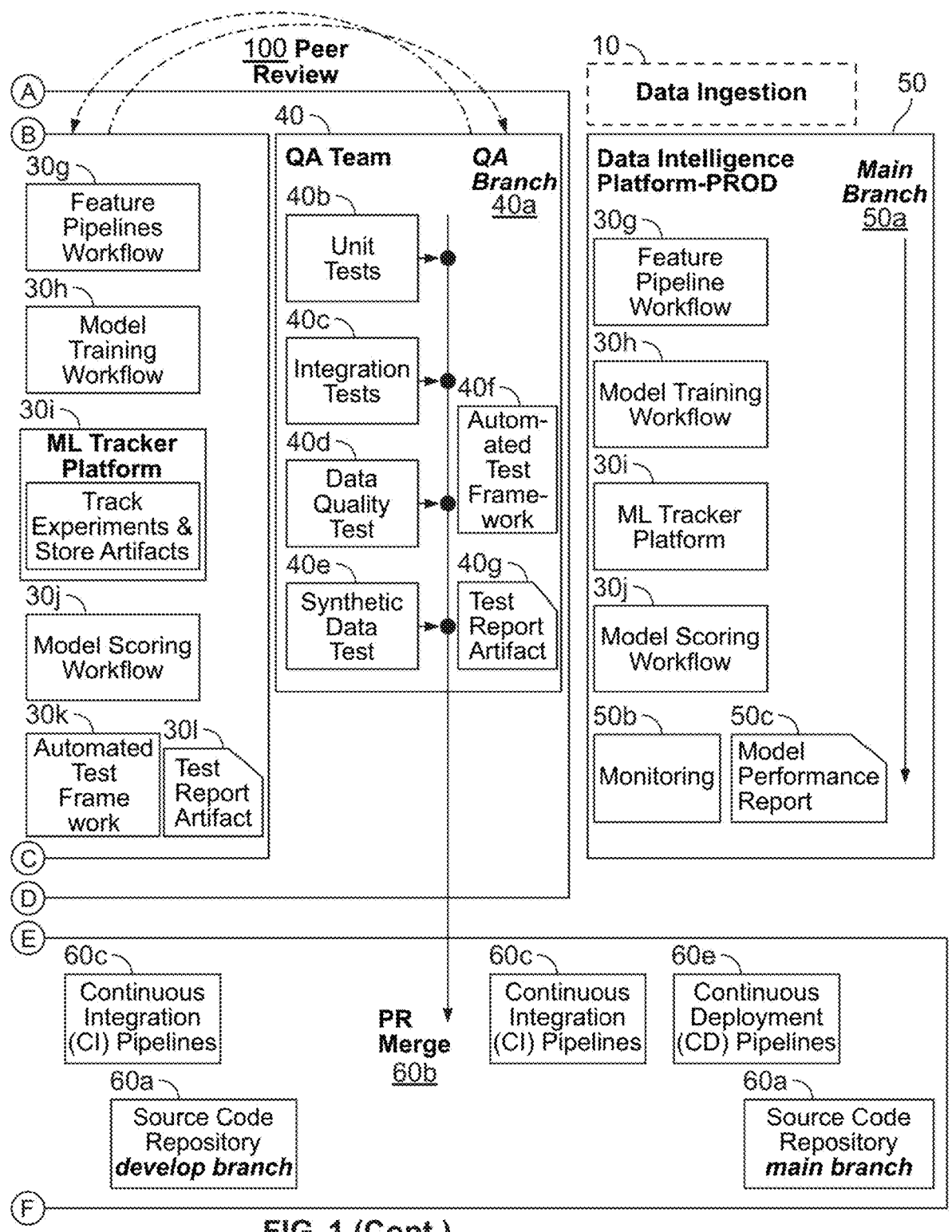

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may improve prior art ML code development branching strategy, peer review, and tagging, and improve developing ML applications with continuous software development practices. A branching strategy may help ML engineers and data scientists manage and organize code in siloed branches, and work independently towards a common goal. The peer review process may enable a feedback loop to collaborate between ML and data science teams to review test cases, review features, code optimizations, and model performances at the same branch level. Embodiments may improve tagging technology to be an iterative process which allows users to understand the progress of an ML project and identify stages; automatic generation of tags may improve this process.

Similarly, these standards may be followed the subsequent stages such as quality assurance (QA) and non-production environments (Non-Prod). Until the QA teams and business teams give a sign off, the branching strategy, peer review, and tagging process may be iterative. Such a process may be integrated with devops principles to continuously integrate code changes, test cases, deploy, and manage jobs. With this approach, the model development and deployment to production may be simplified across all the environments, and ease of management.

An embodiment may provide a pre-defined, structured, and adaptable project template for ML projects which includes ingest, feature curation, preprocess, train, test, predict, and inference folders within the project directory. Such a template may improve ML development technology, and thus may improve ML systems and technology, and help to isolate dependencies and make the application modules modular. Such a template may improve handover between DS and ML teams, and control the data used with ML development and operations. Such a project structure may be first loaded in the branch at repository creation. An embodiment may include independent protected branches for ML engineers to operationalize the model development, alongside data scientists developing the model. Multiple team members can collaborate within the same team, and ensure at least one approver reviews before they can be merged in each protected branch. These branch names may adhere to a standard naming convention. An embodiment may enable peer-review between teams across different branches, such that a data scientist can review machine learning engineers' model, operationalize code to validate model results, review test cases, and suggest code optimizations. Similarly, and vice-versa, ML engineers may review the data scientists' code and give feedback on re-usability features, and scalability of the model.

A DS branch may correlate with a notebooks folder in that data scientists may write code under notebooks folder, and write test cases in the tests folder. An ML branch may correlate to a steps folder in that ML engineers may write optimized code in steps folder by phase (e.g., train, preprocess, infer, etc.) based on the code written by the data scientists in the notebooks folder. ML engineers may write test cases in the test folder. The QA engineers may write end-to-end test cases/suites for the entire code, and review the test cases written by the data scientists and ML Engineers. A peer review and feedback suggestion process may exist between DS, ML, and QA branches.

An embodiment may include automatic tag creation on code merge to upstream branches, which may be triggered based on recent changes pushed to the upstream branch and component which the developer has worked upon recently. An embodiment may provide seamless integration and deployment with devops standards for incremental changes with branching strategy, peer review, and tagging will help to automate the process of delivering changes in controlled and predictable manner, and maintain transparency.

Embodiments may reduce time to market for ML applications, and improve parallelism, automation, and standardization, thus improving ML technology itself. Embodiments may provide more effective collaboration and continuous feedback loops between the teams that may help to make decisions faster and effective. Embodiments may eliminate the manual effort to track and manage models with automated tag creation; and allow users to identify model advancements in real-time with transparency. An embodiment may enforce standards and eliminate time-consuming manual handovers and approvals. Embodiments may provide improvements in technology for efficiency and scalability compared to current tools, which are not compatible with new MLOps methodology.

In one embodiment, to create a code repository or development structure for ML development, a project may begin by cloning or copying a template, which may include mostly empty starter files (but which include some definitions) in each phase folder (a phase may be for example training, inference, deployment etc.). A developer may implement logic by opening a pre-created file such as steps/<phase>/<phase>.py (where <phase> is a phase among different phases), read its short instructions, and fill in substantive code for only two pre-defined function shells: setup and run. On the event of a push or pull request, the CI process may automatically execute a validation check process such as controller.py. This may allow for violations of a template or standardization system to be fixed. If the validation or controller finds a file is missing, as a wrong signature (e.g. input and output definitions), or unimplemented function, it may fail the build performed by the push or pull request and a report or error message may point the reader directly to the problem or issue. In one embodiment, only once all phases pass validation does the CI job succeed and allow merging into the main branch.

In one embodiment, on the creation of new code repository for an ML or NN model, an automatic process may create a code repository or development structure, for example by creating a project template as the first commit in the main branch. A commit may be a discrete change to one or more files in a version control management platform such as the Github platform. A commit may be the data involved in a commit, or the action of a commit. A pull request in such a context may be a request to merge one or more commits into a different branch.

An embodiment may execute code to create a version control management platform template commit including for example a pipeline folder containing deploy files; a configuration folder comprising key-value pairs describing variables used as input to the neural network; a notebooks folder; a steps folder comprising neural network code; a tests folder comprising test scripts; and a utils folder. Such a project template may include stages of ML application development process in the form of folders. The automatic process may create a new develop branch from the main branch to push the final code changes before they are ready for the release. The automatic process may create two new branches prefixed with, e.g. "MLE" for a ML team, and "DS" for data science teams, with the model name and version number. Such an event based trigger may eliminate the need to create branches, create project structure, and child branches manually. Such automation may make a code development process more standardized and streamlined. An embodiment may, with respect to protected branches prefixed with MLE and DS, enforce rules to make code changes into these branches such as code reviews, unit tests, integration tests with continuous integration (CI) pipelines in a pull request before merging. Such a process may ensure automatic test case reports for each of these protected branches are produced for review before integrating new changes to upstream branches in an automated fashion.

Example System

Figure 2:
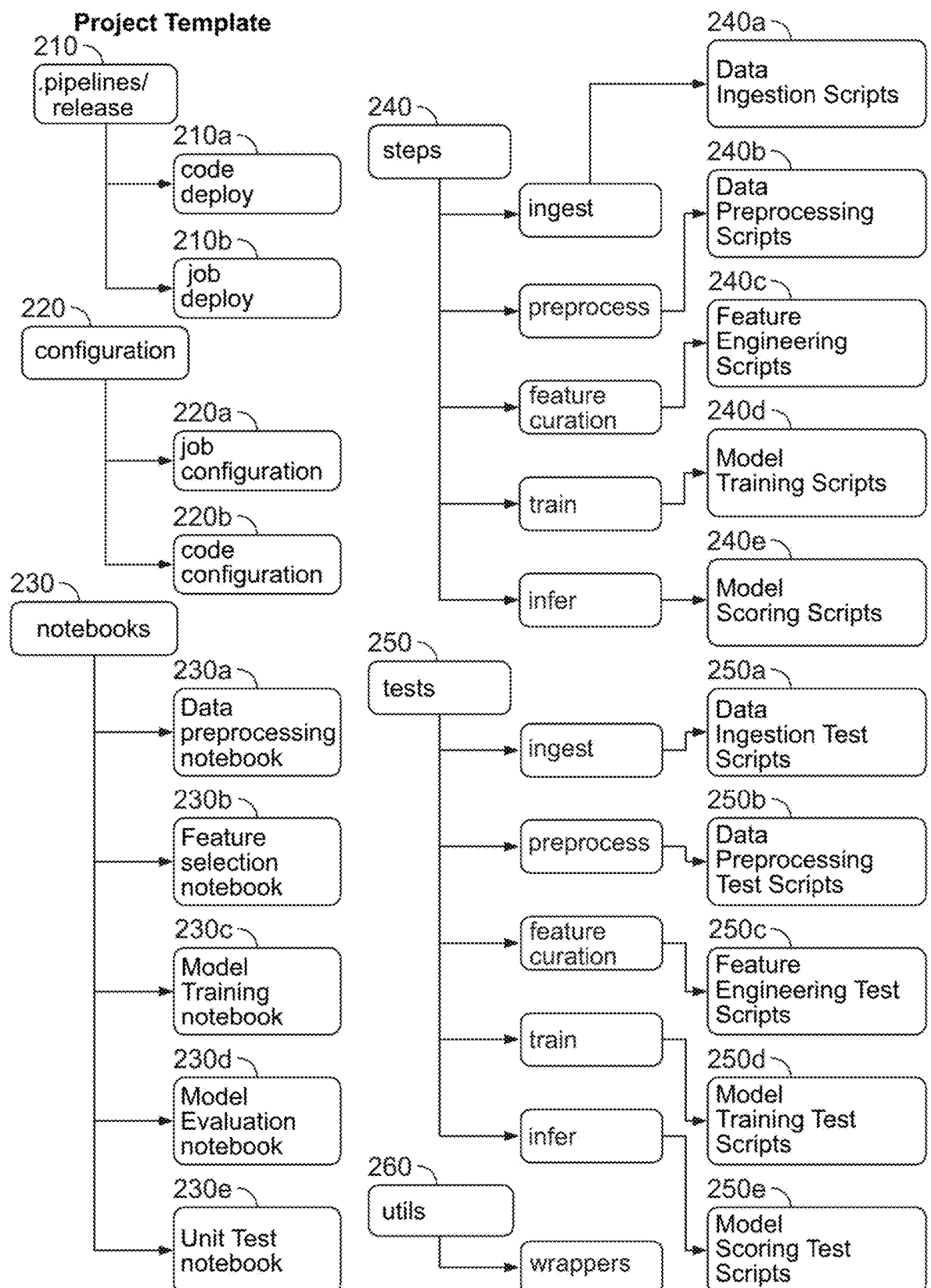
FIG. 2 depicts a project template and file system created in a repository by an ML development system according to embodiments of the present invention.
Figure 9:
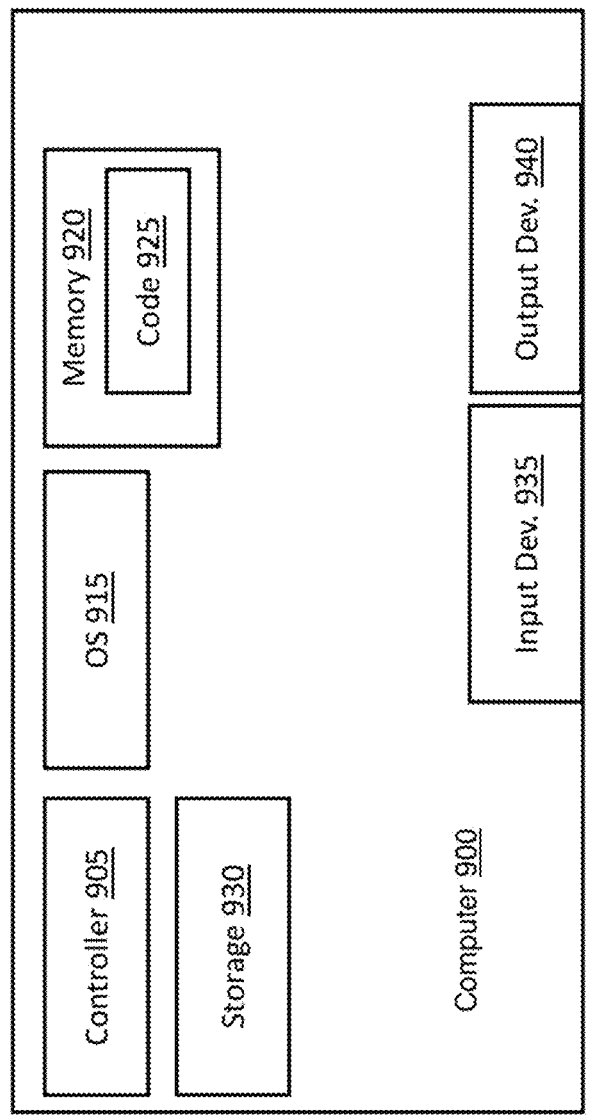
FIG. 9 shows a high-level block diagram of an exemplary computing device according to some embodiments of the present invention.

FIG. 1 depicts an ML development system according to embodiments of the present invention. FIG. 2 depicts a project template and file system created in a repository by an ML development system according to embodiments of the present invention. (It is noted that like elements may be described with different reference numerals across different figures, such as the notebooks of FIG. 1 and FIG. 2.) Some of the components of FIG. 1 may be separate computing devices such as servers or other computer systems (e.g. as shown in FIG. 9) and others may be combined into one computing device. Some modules in FIG. 1 may be included in other computing devices than as shown. Referring to FIG. 1, a version control management platform 60 such as a Github Enterprise or other Github system may allow software teams to manage changes to code over time. A data intelligence platform 90 such as the Databricks platform may provide data computation and analytics in real-time, e.g. for powerful decision making. A data ingestion platform 10 such as the Snowflake platform may process and transform large data into single cloud-based storage medium. A secure credential vault 70 may be a credential vault/secret manager storing passwords as secrets in a computerized vault. A job scheduler 80 such as the Tivoli or IBM work scheduler may schedule and trigger batch jobs, for example on a weekly or monthly basis.

A tag creation module 2 may create tags, as described elsewhere herein. A controller file or process 3 may validate files created or used by developers. A template creation module 5, may create a set of folders (e.g. as in FIG. 2) and/or create a version control management platform (e.g. platform 60) template commit, and or create branches. Modules 2, 3 and 5 may be for example Python scripts.

Referring to FIG. 2, a set of folders may be automatically created (e.g. by template creation module 5 of FIG. 1), for example in a Microsoft OS system. The folders in FIG. 2 may be subfolders or a root directory, e.g. my-ml-project/ may be a root directory including steps, pipeline, and other folders. The folders may be fixed and immutable. An alternate expression of some of the folders in FIG. 2, including a validation or controller (e.g. controller.py) file may be as in Table 1:

TABLE 1

| my-ml-project/ | |
| ⊢ controller.py | # Gatekeeper: enforces rules at CI time |
| ⊢ steps/ | |
|   ⊢ train/ | |
|     ⌊ train.py | # Starter template for training |
|   ⊢ infer/ | |

TABLE 1-continued

|     ⌊ infer.py | # Starter template for inference |
|   ⊢ deploy/ | |
|     ⌊ deploy.py | # Starter template for deployment |
|   ⊢ monitor/ | |
|     ⌊ monitor.py | # Starter template for monitoring |
|   ⌊ explain/ | |
|     ⌊ explain.py | # Starter template for explainability |
| ⌊ README.md | # Overview & developer instructions |

The folders of FIG. 2 may be used by a version control management platform 60 (FIG. 1) such as the Github platform. Subfolders shown in FIG. 2 may include scripts, such as .py (Python) scripts, that are empty of code but which may include structures such as function names or other definitions.

At the inception of a new repository, the project template (e.g. created by controller file or process 3) may be the first commit in the repository's main branch. Such a template may be a predefined structure that contains folders relevant for a new machine learning model application. Folders may be for example typical directories in the operating system used—e.g. Windows directories. A pipelines/release folder 210 may contain code deploy files 210A and job deploy files 210B to deploy source code and jobs workflows to a target environment, such as a computer system as shown in FIG. 9. Pipelines/release folder 210 may contain CI/DC code. Scripts in files 210A and 210B may be scalable and efficient to deploy many jobs all at once, and may execute on a version control management platform such as a GitHub platform. Code deploy files 210A may include code used to develop software; deploy files 210B may include code to create implementations. Such files may include, e.g., Python script files to create NNs or other ML models. Job deploy files 210B may, for a given ML or NN model, schedule its execution and control how it runs and what data it uses.

A configuration folder 220 may contain job configuration 220A and code configuration 220B files having, for example, source tables, schemas, databases, and job configuration details. These files may include source code or definitions including naming conventions, job configurations in the form of code, and table names in a config file which may eliminate the need to hard-code in the source code and promote code hygiene. The configurations folder may contains direct references mapped to the source code. If there is a need to change in source code, the user can make changes in the configuration folder references that will directly reflect in the source code, thereby eliminating that need to hard-code. These files may be committed or saved in a version control management platform such as a Github system and then consumed by a data intelligence platform 90 such as the Databricks platform to execute jobs. Configuration folder 220 may include user-defined names or key/value pairs to define input data for an ML model; typically variables used across a project are defined in this folder, possibly using static Json strings or text files.

A notebooks folder 230 may be a folder for a data science team to experiment, explore, and visualize models and write custom unit test cases to test the code and the model outputs, for example in the Databricks Notebook feature. Files in the notebooks folder 230 may be used by a data science team to work on model development, and may include a data preprocessing notebook 230A, a feature selection notebook 230B, a model training notebook 230C, a model evaluation notebook 230D, and a unit test notebook 230E. A notebooks folder 230 may include a template to keep notebooks (e.g. bodies of code) as they are rewritten and put into a structured format. The ML team may input raw notebooks from data scientists, which work but which could be improved; the ML team may rewrite and modularize the notebooks, converting them into readable, modular, and scalable scripts. This rewrite may be performed by humans, but enforced for example by tags, and by a CI/CD building process. For example, when code is pushed in a repository there may be a template for a CI/CD process, e.g. controller file 3, to test and ensure code is in a correct format.

Templates or guidelines, as files, may be pre-placed in the subfolders of notebooks folder 230, into which further code may be written. These templates may enforce a structure and nomenclature across an entire project. Users may write ML code into subfolders of notebooks folder 230 (e.g. based on or into template files). A steps folder 240 may contain multiple sub-folders such as ingest, preprocess, feature curation, train, and infer subfolders, dividing up such data in a novel manner. Steps folder 240 may include work areas for inference (infer), training, etc. Templates may be or include an infer.py file which may be automatically created with boilerplate or started code to fast track or be a catalyst for development. Each folder may be independent and modular for ML engineers to streamline the process of development and be ready to be deployed. The code files inside each of the steps folder 240 sub-folders may be committed or saved in a version control management platform 60 such as a Github system and then consumed by a data intelligence platform 90 such as the Databricks platform to execute jobs in this platform. Such subfolders may include data ingestion scripts 240A (e.g. Python scripts) to ingest data from multiple sources into one single table; data preprocess scripts 240B to remove data quality issues, and inconsistencies in the data; feature engineering scripts 240C to curate relevant features for the model; model training scripts 240D to train model, track experiments, and store artifacts in the ML Tracker platform; model scoring scripts 240E to get scores on unseen data from the model in the artifacts and to be used for inference (ML or NN code for inference may be for example infer/infer.py). Scripts to perform ML functions may be written to folders within steps folder 240, and branches may hold code in these folders. For example, Python scripts may be placed in an ML branch and code in notebooks may be placed in a DS branch. The original project template in the main may be inherited by the ML, DS, and QA branches during branch creation. Each branch may have access to the contents in the project template and each team may write their code and/or scripts in the respective folders. Templates or guidelines, as files, may be pre-placed in the subfolders of steps folder 240, into which further code may be written. These templates may enforce a structure and nomenclature across an entire project.

A tests folder 250 may include test scripts for the subfolders in a steps folder 240; each tests folder 250 may have different test cases, independent and modular, for ML engineers to test the individual functionality. Code files inside sub-folders of tests folder 250 may be committed or saved in a version control management platform 60 such as a Github and then consumed by a data intelligence platform 90 such as the Databricks platform to execute jobs in this platform. Subfolders of tests folder 250 may include ingest folder 250A, preprocess folder 250B, feature folder 250C, training folder 250D, and inference folder 250E.

A utils folder 260 may include wrapper scripts to support infrastructure configuration and services. These scripts or code files may interact with a data ingestion platform 10 such as the Snowflake data warehouse tool to read and write data between, for example, the Snowflake and Databricks platforms.

Tags

An embodiment may automatically create tags or names for branches, releases or other Git objects, for example, when branches are created, or when a pull request is created using a version control management platform 60 such as the Github platform. An embodiment may provide automatic tag creation, which may be triggered when new code changes are merged to develop or upstream branches, by a process executed periodically. An embodiment may execute code to automatically create a tag associated with a pull or merge request, and alter version control management platform data, such that the tag is displayed or used in conjunction with or to label data describing the branch associated with the pull request.

For example, upon or in response to a user making a pull or merge request to an upstream branches, a code module (e.g. a tag creation module 2, written for example in Python, shown in FIG. 1) external to version control management platform 60 (FIG. 1) may recognize new code or the pull or merge request, and may call a function to create a tag, such as use a Github API to call a Github Tag creation routine. Based on the name of the tag, users may have a complete picture to track the progression of machine learning models at any given point of time. Tags may be read by users to understand how project is working or structured, which may improve ML development by adding transparency. Automatic processes may read tags to produce reports or take other actions. Such a method may help the users and managers actively track the state of the machine learning model development in real time.

For example, when an ML engineer integrates new features in code from a MLE to develop branch by a pull request, a new tag may be created automatically by tag creation module 2 on the develop branch with name "feature curation" and a version "v0.1". If a developer merges new code to upstream branches tagged as "1"; the same tag name may be updated to 1.2, as new versions are created. New tags with updated versions may be created based on the code changes merged to the develop branch from the developers.

In one embodiment, a CI build may be followed by a PR merge (e.g. using the Github platform), followed by tag creation module 2. Tag creation module 2 may execute periodically (e.g. nightly) and may check PR results, and based on this create or alter tags. Code may be executed to automatically create a tag by for example searching a commit history for a unique commit number associated with a pull request, and based on this search creating a tag. For example, tag creation module 2 may search for PR merges, or search within a commit history, and based on this create tags. Tag creation module 2 may search in a commit history, e.g. for the DS, MLE and QA branches, for a unique commit ID where the type of the commit is a PR (pull request). Such a search on the commit history may be done by using Github API calls from tag creation module 2. Tag creation module 2 may be executed periodically, e.g. once a day.

Within a commit history, a commit may have a unique number. If the unique commit number is associated with a PR, a process may determine that the commit details are the source, target or feature branch, and then may create a tag name on top of a branch such as a DS or MLE branch, and may use a Github API to create a tag, which may be used or displayed to a user on a branch. To identify a commit associated with a PR, after the commit ID with pull request type is identified, the name of the source branch may be identified, e.g. the feature branch that is merged to DS, MLE or QA target branch from the PR data. In a development platform such as Github, each code change committed by the PR may be identified by a unique identifier or number. When a user completes a PR on a branch (e.g. DS/ML/QA) from the feature branch, a unique number (e.g. in the form of character string) may be created. These unique numbers will be present in the branch history along with the PR details. Whenever a tag is created, the code may search the branch history for a unique number and its details and check if the unique number is created by the PR. This unique number may be used to create the tag.

Tag creation module 2 may create the tag name, and pass it to Github e.g. via an API.

Figure 6:
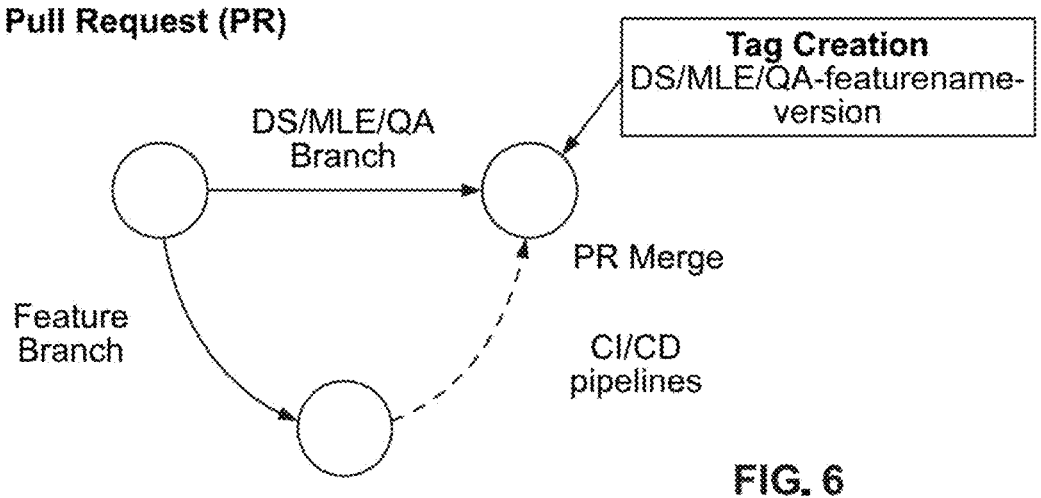
FIG. 6 provides an example process for creating tags according to embodiments of the present invention.

FIG. 6 provides an example process for creating tags according to embodiments of the present invention. In the process of FIG. 6, the execution of codeof tag creation module 2 may be performed to create tags as a checkpoint. A checkpoint may refer to new or modified code in a branch. This may act as a reference for any user to see what was developed so far in the code. The execution or utility call may be triggered on a Pull Request merge (PR Merge) in Github. The tag creation on DS, MLE or QA branches may be executed when a user merges new code from the source branch (e.g. Feature Branch) which may be named, e.g. feature/<branch_name> into a target branch such as DS, MLE or QA branch. The tag nomenclature may be for example the DS, MLE or QA-<feature_name>-<version_number>. The <feature_name> in the tag may be the name of the Feature Branch.

Figure 7:
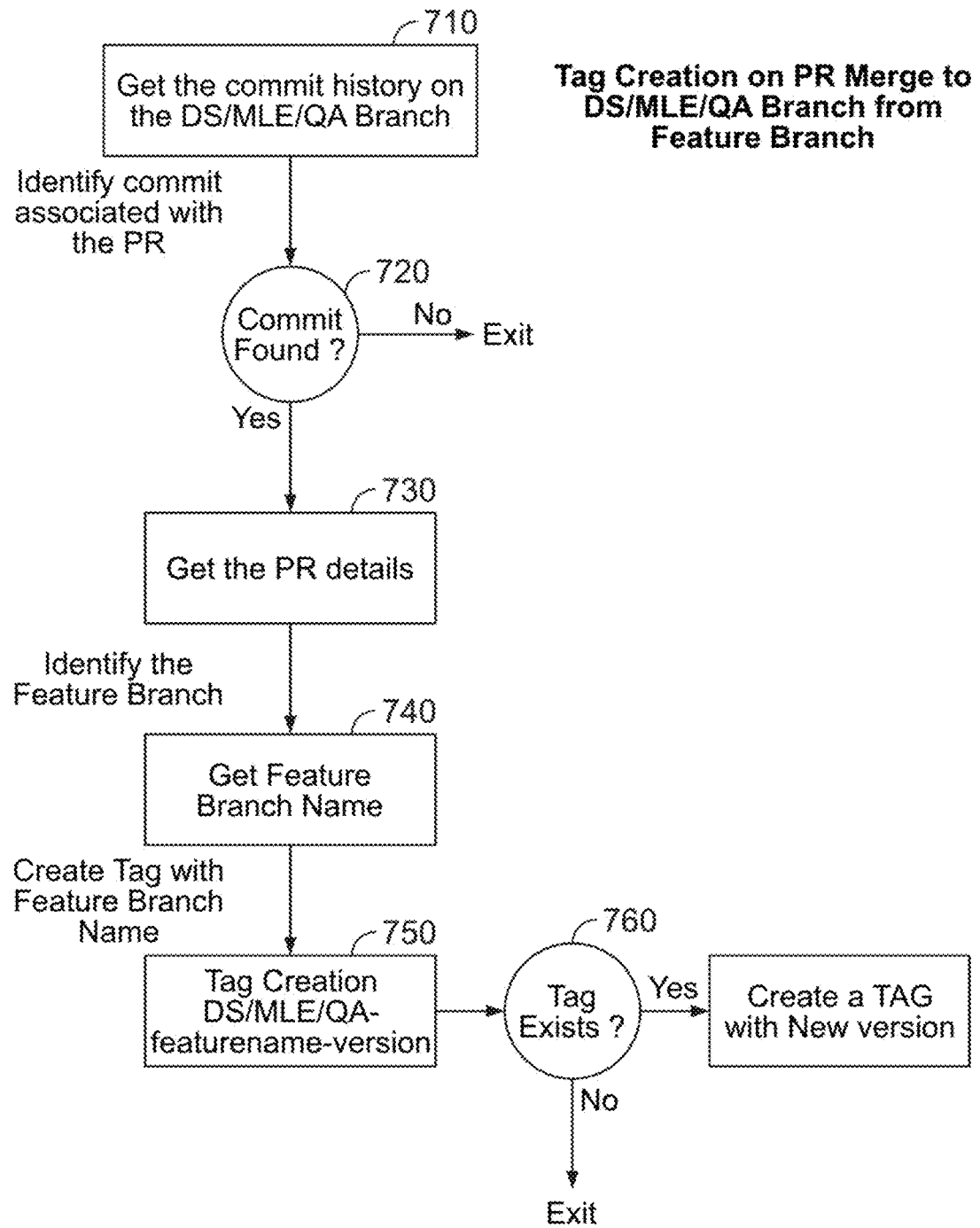
FIG. 7 describes an example process to create the tags on a target branch according to embodiments of the present invention.

FIG. 7 describes an example process to create the tags on a target branch according to embodiments of the present invention. Code to execute the process of FIG. 7 may be executed periodically, and, for example in response to branch creation, or pull requests. Referring to FIG. 7, in operation 710 a process may receive or access all of the commit history for the relevant (e.g., DS, MLE or QA) branch to identify or search in Github or other history for the commit associated for the pull request. In operation 720, if the commit is not found, the process may end; otherwise if the commit is found, the commit associated for the pull request and details of the pull request may be used in operation 730. In operation 730, will from the pull request details, the process may search for a feature branch name. Github or another process may save information after a PR completes, such as source branch name, target branch name, author, and PR information; this information may be searched In operation 740, the feature branch name may be obtained and may be used in operation 750 (e.g. by tag creation module 2) to create a tag with a standard naming convention. In operation 750, the nomenclature for the tag may be a prefix with the branch type (e.g. DS, MLE or QA, a common prefix)-<feature_name> (from operation 740)-<version_number>; the tag may be created on the target branch. An example tag nomenclature is feature/<DS/ML/QA>_<feature_name>_v<version_number> and an example tag name is DS_dataingestion_v1. In operation 760, the created tag already exists, the code may create a tag with a new version.

Validation

Embodiments may validate the ML development process, and the resulting ML model, for example by providing an ML project with a consistent, enforceable blueprint or template, useable by developers, and by enforcing the use of this blueprint or template.

A validation check process such as a controller file or process 3 of FIG. 1 (e.g. controller.py) may be saved at a root directory (e.g. my-ml-project/) or in another location that scans and validates each step. The root directory may initially include a steps/directory or folder with one template or file per phase. For example, steps may include train.py, infer.py, deploy.py, monitor.py, explain.py; each of these templates may contain only minimal "fill in the blanks" instructions for a user. Upon the event of a commit, a process may be executed to validate files folders such as the pipeline folder, configuration folder, notebooks folder, steps folder, a tests folder, and utils folder. A hook such as a continuous integration (CI) hook may execute controller file or process 3 on each commit (e.g. the execution of controller file 3 may be bound to the event of a commit) to validate existing files created by developers to catch any deviation from MLOps best practices or the templates, and provide warnings, reports, etc.

The automatic validation may include checks such as determining whether or not files in the relevant folder exist; whether code within files follows certain or specified syntax; determining whether or not certain or specified functions are contained within files in a relevant folder; and determining whether or not a function within a file in a relevant folder has a correct signature. For example, on invocation (e.g. in a CI pipeline), controller process 3 may ensure, or check whether or not, for every phase folder (e.g. ingest, preprocess, etc.):

File Presence: that certain files exist, such as that steps/<phase>/<phase>.py exists where <phase> is a phase, e.g. ingest.

Standard Interface: Each analyzed file declares certain functions, for example in one embodiment exactly two functions (or methods):

setup ( . . . ): prepares resources, configs, credentials. Setup may input the required configuration details.

run ( . . . ): executes the core logic and returns results in a defined format. The run function may perform the inference logic in the case infer.txt file.

Naming Conventions:

The files in the phase folders and its main class or function follow a consistent naming pattern (e.g. TrainStep, InferStep, etc.).

Correct Signatures (e.g. input and output definitions for functions), including for example:

setup and run have prescribed parameters and return types.

If any validation or check fails, a validation, check or controller process 3 may create report with clear, actionable errors (e.g. "Missing steps/infer/infer.py" or "run ( ) not implemented in steps/train/train.py") and may exit with a status of failure. An embodiment may generate predictions of trained machine learning model on input dataset. The example code (e.g. an infer.py file) in Table 2 below may generate predictions of trained machine learning model on input dataset. A process such as an infer.py file when executed may analyze a model after development, as opposed to other processes discussed herein which validate models during development. An infer.py file under an Infer phase may execute after the train phase completes. The code in Table 2 may import helper functions such as "load_model" to load the ML model file from a folder such as utils; and "read_data" to read the input table from a datawarehouse/data lake. The code may input table config details from the configuration file parameter in a setup function, consume configuration values (e.g. database name, schema name, and table names) in the configuration file, perform predictions with the trained machine learning model in the run function on table name, e.g. input data from consuming configuration values.

TABLE 2

```
# import helper function load_model, read_data from utils folder in
project template from utils import load_model, read_data
# declare class name InferStep
class InferStep:
# initialization method to get configuration file from
configuration_file_path
        def __init__(self, configuration_file_path):
            self.config = configuration_file_path
        def setup(self):
            """
            fetch configurations from configuration file.
            Returns:
                DB(string): database name
            SCHEMA(string): schema name
            input_table(string): input table name
            model_path(string): model file path
            """
        # get table databse name
            DB = self.config['DB']
        # get table schema name
            SCHEMA = self.config['SCHEMA']
        # get input table data to perform predictions by the run fucntion
            input_table = self.config['input_table']
        # get machine learning model file path
            modelpath = self.config['model_path'])
            return DB, SCHEMA, input_table, modelpath
        def run(self):
            """
            Score an input dataset using a trained model.
            Returns:
                predictions (list): list of predictions on input data.
            """
        # get configuration details by calling setup function
            db, schema, table, modelpath = self.setup( )
        # read data from datawarehouse/data lake by calling read_data
        function
            data = read_data(db, schema, table)
            # Load the trained model object by calling load_model function
            model = load_model(modelpath)
            # Make predictions using the model and data
            predictions = model.predict(data)
            return predictions
if __name__ == "__main__":
    # get object from the class InferStep
        inferstep = InferStep("configuration_file_path")
    # run function call from inferstep object
infersetup.run( )
```

Figure 3:
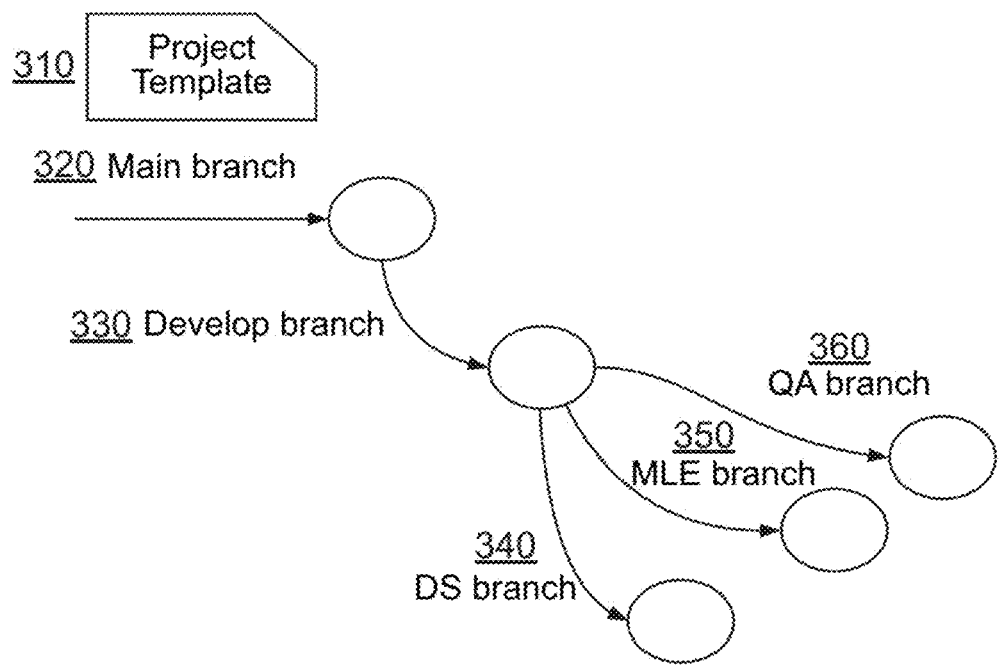
FIG. 3 describes an automated branching strategy enabling MLOps methodology, according to embodiments of the present invention.

FIG. 3 describes an automated branching strategy enabling MLOps methodology, according to embodiments of the present invention. Referring to FIG. 3, an automated process such as Github may create, at the beginning of development for a ML system, a new machine learning repository; folders may be created by other automatic code such as template creation module 5. A process may load a project template 310 loaded inside a main branch 320. This template may be present across all the branches in a repository, and act as single source code for all the developers to save and manage MLOPS project code residing in a version control management platform 60 such as a Github system. The contents of such a branch may be replicated to its descendants when a new branch is created. New branch creation feature is part of the Github system, and embodiments of the present invention may automatically create specific branches as described herein. Main branch 320 may be the production release branch only used to deploy code from this branch. From main branch 320, a develop branch 330 may be automatically created, which may be considered as a pre-release or pre-deployment branch. The code inside branch 330 may be merged after thorough review and appropriate testing. From develop branch 330, three new siloed branches may be automatically creased, such as DS Branch 340, MLE Branch (Machine Learning Branch) 350, and QA Branch 360. The different branches may allow teams associated with each branch (e.g. DS team 20 associated with DS branch 340) to work on their tasks without disturbing the other teams. Teams may later collaboratively review code using feedback. DS Branch 340, MLE Branch 350, and QA Branch 360 may be created for respective teams relevant to these branches to work on their activities independently, for example in a Databricks or other platform. Version control management platform such as Github Enterprise may enable users to work on these branches in for example the Databricks platform.

The branches in FIG. 3 may be created automatically during the creation of a new machine learning repository. The naming convention of these branches may start with a pre-defined prefix such as DS for data science branch followed by the model's name and version of the branch. If the model is new, for the initial version a suffix may start as v0.1. Such a convention may be the same for MLE branch and QA branch. For example, a name may be branch name: DS-<modelname>-v0.1. After the example branches in FIG. 3 are created, other branches may be created, e.g. as shown in FIG. 4.

Figure 4:
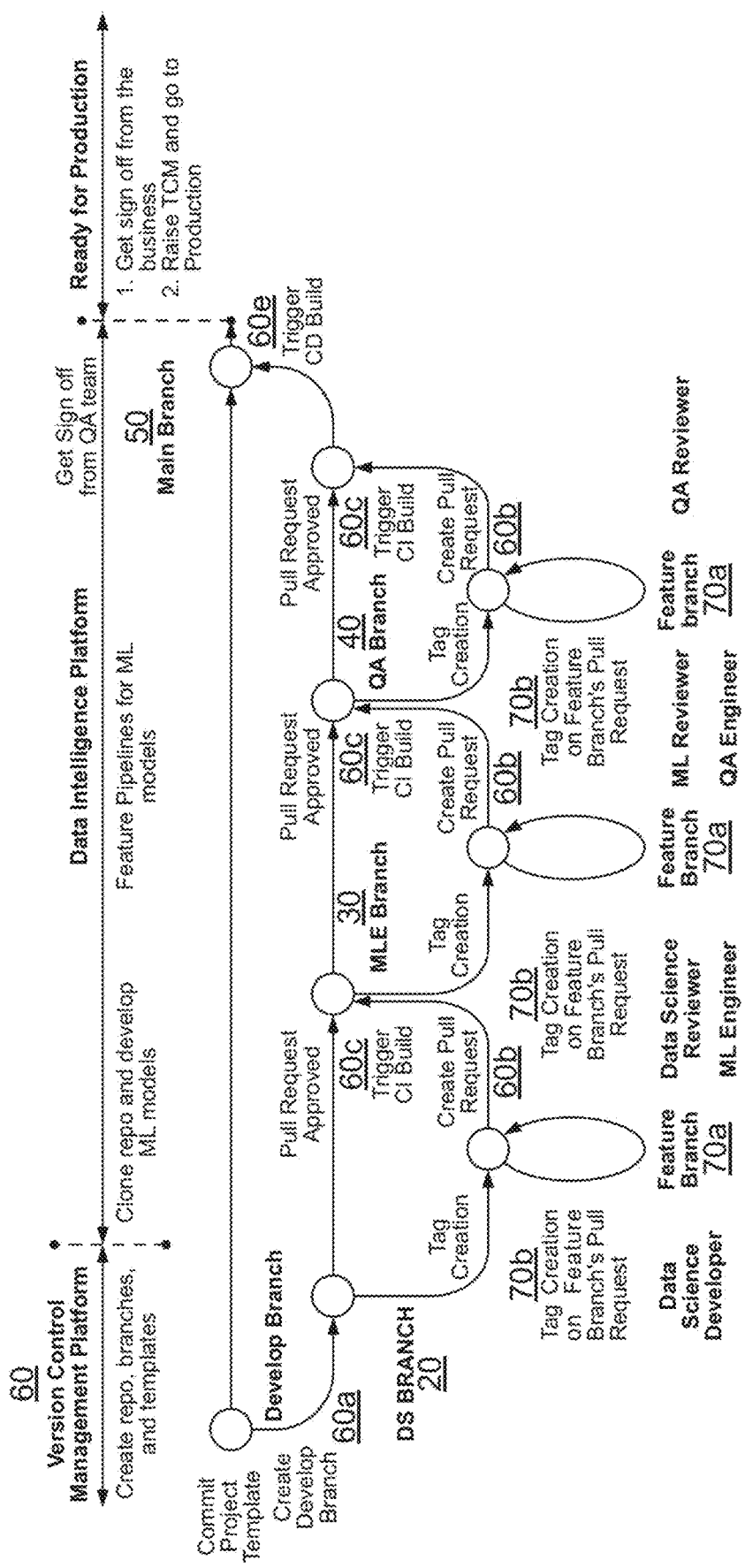
FIG. 4 describes an automated branching strategy process including an overview of interaction between branches, according to embodiments of the present invention.

FIG. 4 describes an automated branching strategy process including an overview of interaction between branches, according to embodiments of the present invention. FIG. 4 provides an example overview of the interaction between an MLE branch and develop branch; between a QA branch and develop branch; and between the develop branch and main branch. Referring to FIG. 1 and FIG. 4, each of DS branch 340, MLE branch 350, and QA branch 360 may have different roles and responsibilities within the branching strategy. As part of this strategy, each branch may actively interact with various technical platforms described herein. For example, version control management platform 60 may help software teams manage changes to source code over time. Data intelligence platform 90 may be used for data computation and analytics in real-time for powerful decision making. Data ingestion platform 10 may process and transform large data into single cloud-based storage medium, e.g. a data warehouse. Credential vault 70 may act as a credential vault/secret manager to store passwords as a secret in a vault. Job scheduler 80 may schedule and trigger batch jobs, e.g. on a weekly or monthly basis.

A data science team 20 may work using DS branch 20A in data intelligence platform 90 such as the Databricks platform to experiment, explore, and develop different machine learning models. After DS team 20 works on the first iteration of a model, ML team 30 may further create the model. In DS branch 20A, a DS team 20 may create and manage notebooks for each stage in notebooks folder 230. The code inside notebooks folder 230 may be committed inside a pre-defined project template. Each data scientist in data science team 20 may start developing notebooks such as:

Data preprocessing notebook 20B in data intelligence platform 90 to explore and try different data preprocess techniques to eliminate data inconsistencies, impute missing values, and remove inaccurate columns. A DS team may use preprocessing to remove "bad" data and experiment with algorithms to provide good output.

Feature selection notebook 20C in data intelligence platform 90 to visualize and explore myriad features and choose relevant features based on the relevance to model business use case.

Model training notebook 20D in data intelligence platform 90 to train and experiment multiple models, and choose the best one based on the model metrics. The best model may be stored in a separate location called model registry 20B, part of data intelligence platform 90.

Model evaluation notebook 20E in data intelligence platform 90 to validate the model performance on the test or unseen data to check and analyze the model performance on the train dataset.

Unit test notebook 20F in data intelligence platform 90 for the data scientists to write their own custom test cases on individual components and check for the expected output. The results from the tests cases may be stored in test report artifact 20H which may contain the details and the results of these tests.

When a team of data scientists has a model and the notebooks ready to deploy, a team member may raise a pull request 60B (FIG. 4) to merge the code change from DS branch 20A to develop branch 60A. Before merging into develop branch 60A, the commits in DS branch 20A should, according to one example workflow, be reviewed by at least one approver within the team, resolve comments if any, and complete execution of continuous integration (CI) pipelines 60C, for example in version control management platform 60. A version control management platform 60 such as Github Enterprise may include code compilation and unit tests to merge new changes into develop branch 60A in version control management platform 60. Finally, there may be peer review between DS branch 20A (e.g. in the Databricks platform) and code in MLE branch 30A (e.g. in the Databricks platform). This peer review may create a feedback loop between two teams to collaborate towards a common goal to improve code quality, knowledge sharing, and team cross-communication. FIG. 4 describes an overview of interactions between a DS branch and develop branch, in one embodiment. The code for a CI pipeline may reside in a folder such as pipelines/release folder 210 and code deploy 210A in FIG. 2.

In FIG. 4, the DS team can create one or multiple feature branches 70A, possibly with a standard naming convention, from DS branch 20A to commit the code in the notebooks. Once the code changes from the feature branch 70A are merged into the upstream DS branch 20A, a new tag 70B with the version in version control management platform 60 (e.g. Github Enterprise) may be created automatically on the target branch. The automatic tag creation may be driven by an external script that checks for new pull request commits to create tags daily. Such an embodiment may help the users and managers actively track the status on the data scientists' development and may give a feature to look back from the past changes by the team. This process may be automated in version control management platform 60 (e.g. Github Enterprise).

Machine learning team 30 may work on MLE branch 30A, e.g. in data intelligence platform 90 such as the Databricks platform, to convert notebooks developed by data science teams 20 into readable, modular, efficient, and scalable scripts for each stage in the data science process. After conversion, the scripts may be committed inside a pre-defined project template steps folder (e.g. folder 240) under ingest, preprocess, feature curation, train, and infer sub-folders, including scripts 240A-240E. Each machine learning engineer in the team may start developing scripts such as:

Feature engineering script 30B in data intelligence platform 90 such as the Databricks platform, to convert feature selection notebooks 20C (e.g. in Databricks) from DS branch 20A (e.g. in Databricks) into a modular, scalable, configurable, and structured template for easy readability. These scripts may be used as input to create automated feature pipeline workflows 30G (e.g. in Databricks) in data intelligence platform 90 and its workflow configurations may be saved in the project template job configuration folder (e.g., see FIG. 2) to automatically deploy the feature workflows in the target environment.

Data preprocessing Script 30C (e.g. in Databricks) to automate the process to clean the data from the Data Preprocessing Notebook 20B from the DS Branch.

Model training script 30D may be used to train the model handed over by the data science team 20 in the Model Training Notebook 20D in Databricks. The model trained in the data intelligence platform 90 may be tracked and stored with parameters and metrics in the ML Tracker Platform 30I. A new automated model training workflow 30H in Databricks may be created which takes in the data preprocessing script 30C and model training script 30D in Databricks. The workflow configuration may be saved in the project template job configuration folder (e.g. FIG. 2) to automatically deploy the feature workflows in the target environment, Model scoring script 30E (e.g. in Databricks) may be used to score the test or unseen data on the trained model tracked and stored from ML Tracker Platform 30I in Databricks. Its corresponding model scoring workflow 30J in Databricks is created to predict the score on the data test data.

Unit test scripts 30F (e.g. in Databricks) may be developed by the machine learning team 30 to test the individual functionality of all the above scripts and workflows and write back the test results to a test report artifacts 30I (e.g. in Databricks). An automated test framework 30K (e.g. in Databricks) may execute unit test scripts from the test folder for each stage in the project template (e.g. in FIG. 2) and generate test report artifacts 30L to the engineers that may explain the coverage of test cases in different modules.

Within ML team 30, once the machine learning engineers have finalized source code and have performed optimizations and testing, and are ready to deploy, a team member may raise a pull request 60B (e.g. in Github Enterprise) to merge the code change from the machine learning branch 30A (e.g. in Databricks) to the develop branch 60A (e.g. in Github Enterprise). Before merging into develop branch 60A (e.g. in Github Enterprise), the commits in the machine learning branch should, according to one example procedure, be reviewed by at least one approver within the team, who may resolve comments if any, complete execution of continuous integration (CI) pipelines 60C (e.g. in Github Enterprise), including code compilation, and unit tests to merge new changes into develop branch 60A (e.g. in Github Enterprise). This whole process may be automated in version control management platform 60 (e.g. Github Enterprise), Finally, there may be a peer review 100 between the code in MLE branch 30A and code in DS branch 20A. Peer review 100 may create a feedback loop between two teams to collaborate towards a common goal to improve code quality, knowledge sharing, and team cross-communication; this holds true vice-versa. In addition, the code for CI pipeline may resides in folder .pipelines/release folder 210, code deploy 210A and job deploy 210B in FIG. 2.

The ML team may create one or multiple feature branches 70A with a standard naming convention from ML branch 30A to commit the code (e.g., in python scripts). Once the code changes from the feature branch 70A are merged into the upstream ML branch 30A, a new tag 70B with the version in Github Enterprise may be created automatically on the target branch.

Quality assessment team 40 may work on QA branch 40A in data intelligence platform 90 such as the Databricks platform to prevent issues by detecting and fixing quality issues in a software development process and to reach certain standards. Quality assessment team 40 may implement the following example operations to ensure the quality of the application meets established standards:

- Unit tests 40B (e.g. in Databricks) quality assessment team 40 may examine a single unit of code written by ML team 30 and add new unit test cases to test the functionality of each module. The new test cases may be written in a test folder 250 project template (e.g. FIG. 2) for each sub-folder. This may apply for each sub-folder under test folder.
- Integration tests 4C (e.g. in Databricks): after the successful completion of unit tests, QA team 40 may check individual units of a software project to expose defects and problems to verify that they worked together by design of the application, and produce test cases,
- Data Quality Tests 4D (e.g. in Databricks): In this test, QA team 40 may validate key characteristics of the data tables to be complete, reliable, accurate, and free from duplicates. This may help for ML models to be reliable, sound, and transparent.
- Synthetic data tests 4E (e.g. in Databricks) may include creating high-quality data that mimics the actual data that used to do test the model performance on different types of data. This establishes a baseline performance of the model.

When QA team 40 are ready for sign off to merge to upstream branches, one of the team members will raise a pull request 60B (e.g. in Github Enterprise) to merge the change from the QA branch 40A (e.g. in Databricks) to the develop branch 60A (e.g. in Github Enterprise). Before merging into the develop branch, the commits in QA branch 40A should according to one example procedure be reviewed by at least one approver within QA team 40, resolve comments if any, and complete execution of continuous integration (CI) pipelines 60C, which may include code compilation to merge new changes into develop branch 60A. After the merge completes, a new tag 60D with the version may be created automatically on the target branch. This may help the users and managers actively track the status on quality assessment and gives a feature to look back from the past changes by QA team 40. This process may be automated in the version control management platform 60. Finally, there may be a peer review 100 between the code in QA branch 40A and code in MLE branch 30A. This peer review 100 may create a feedback loop between two teams to collaborate towards a common goal to improve code quality, knowledge sharing, and team cross-communication. The same may occur vice-versa: for example, if the ML team writes code in the ML branch with custom test cases, the QA team can review and give feedback on the test cases written by the ML team. In addition, the ML team may review the test cases written by QA team and give feedback or sign off to ensure all the testing possibilities are covered by the QA team. This may promote collaboration and reliability on the work done between the QA branch and the ML branch. The code for a CI pipeline may reside in a folder such as pipelines/release folder 210 and code deploy 210A and job deploy 210B in FIG. 2.

The QA team may create one or multiple feature branches 70A with a standard naming convention from QA branch 40A to commit the code to test the code. Once the code changes from the feature branch 70A are merged into the upstream QA branch 40A, a new tag 70A with a version number (e.g. in Github Enterprise) may be created automatically on the target branch.

After QA team 40 team signs off and other sign offs occur if needed, QA team 40 or another team may raise a pull request from develop branch 60A in version control management platform 60 such as a Github Enterprise to main branch 50A (e.g. in Github Enterprise) to merge the final code changes to be deployed. In version control management platform 60, on a pull request at least one reviewer may approve the changes for the release, resolve comments based on the feedback, and the execute continuous deployment pipelines 60E to deploy the code to target environment. On merge completion, a new tag 60F (e.g. in Github Enterprise) with new build number (e.g., in the form of DD.MM.YYYY) may be created automatically on the main branch 50A (e.g. in Github Enterprise). The code deployed may be scalable, efficient, and configurable code package to execute feature pipeline workflows 30G in data intelligence platform 90 such as the Databricks platform, model training workflow 30H (e.g. in Databricks), ML tracker platform 30I (e.g. in Databricks) to track experiments and artifacts, model scoring workflow 30J (e.g. in Databricks), and monitoring module 50B (e.g. in Databricks) to publish model performance reports 50C to the business users.

Figure 5:
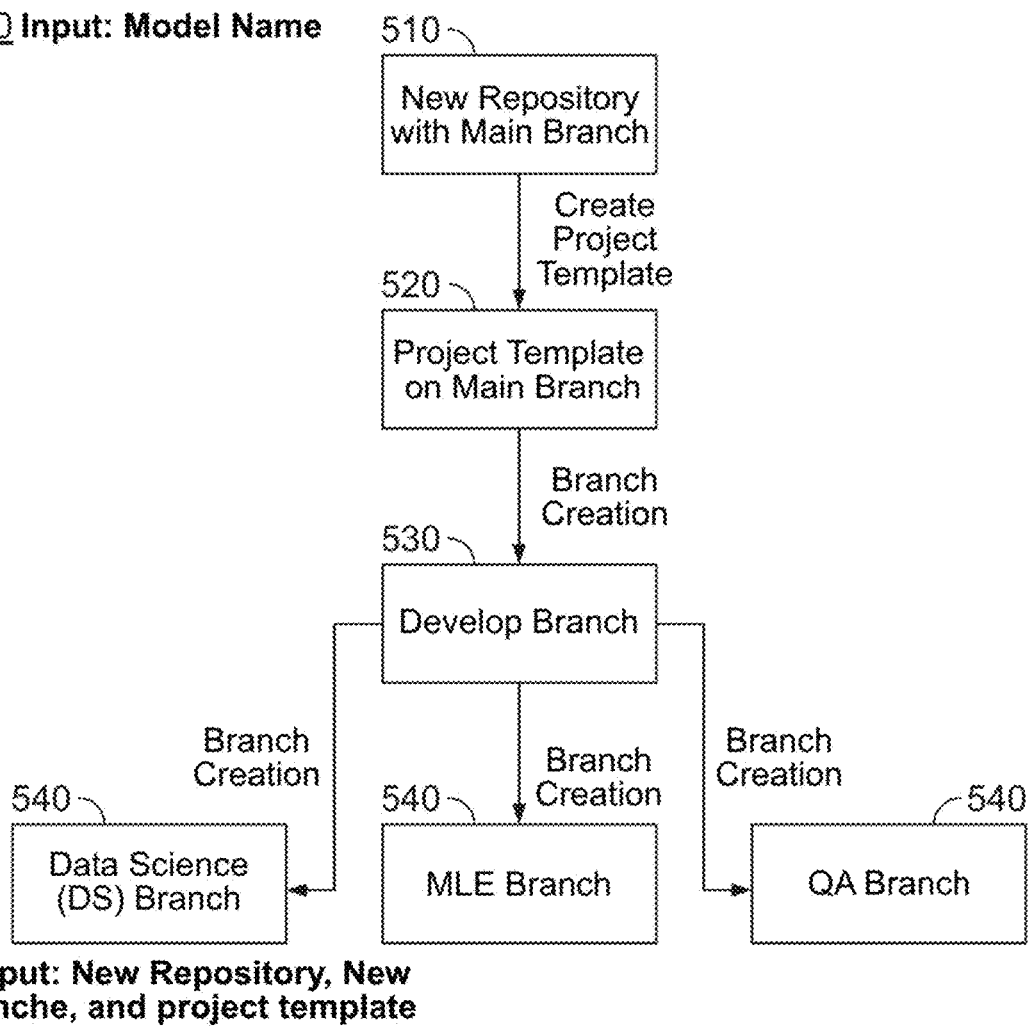
FIG. 5 provides an example process for creating branches and templates for a new ML project, according to embodiments of the present invention.

FIG. 5 provides an example process for creating branches and templates for a new ML project, according to embodiments of the present invention. As with other flowcharts and processes described herein, while an exemplary method is depicted for illustrative purposes in the flowchart of FIG. 5, it will be appreciated by those skilled in the art that features and operations from this procedure may be selectively combined with features and operations from alternative embodiments of the invention without departing from the remit of the disclosure. Further, while certain features and operations are expressly included in the flowchart of FIG. 5 (and other method descriptions herein), it will be appreciated by those skilled in the art that not all depicted features and operations are mandatory elements, and that different embodiments may omit certain features or operations without departing from the remit of the disclosure. Accordingly, embodiments including combinations of the features and operations recited in FIG. 5 are expressly within the remit of the disclosure and do not constitute an intermediate generalization of the same.

An embodiment may automatically create branches, for example by executing code to create version control management platform branches such as a main branch; a develop branch branching from the main branch; a data science branch branching from the develop branch; a machine learning branch branching from the develop branch; and a quality assessment branch branching from the develop branch. For example, in FIG. 5, code written in Linux may be used to create branches in a version control management platform 60 such as the Github platform may execute to create a new repository, branches, and project template. The code execution may be triggered externally by a developer when a new project request is required. The input to the code may be the name of the project and output of the code may be the creation of a new repository, project template, and branches for the new ML project. Referring to FIG. 5, in operation 500, a model name input by a user may be received. In operation 510, the code may create a new repository with a main branch. In operation 520, a project template may be created and committed to the main branch.

An example of a project template is shown in FIG. 2. In operation 530, a develop branch may be created. On the creation of a new develop branch, this branch may inherit the content from the main branch. In operation 540, a data science branch, an MLE branch, and a QA branch may be created. The DS Branch, MLE Branch, and QA Branch on creation may inherit details from the develop branch. Other sets or nomenclatures of branches may be used, and other operations may be used.

Figure 8:
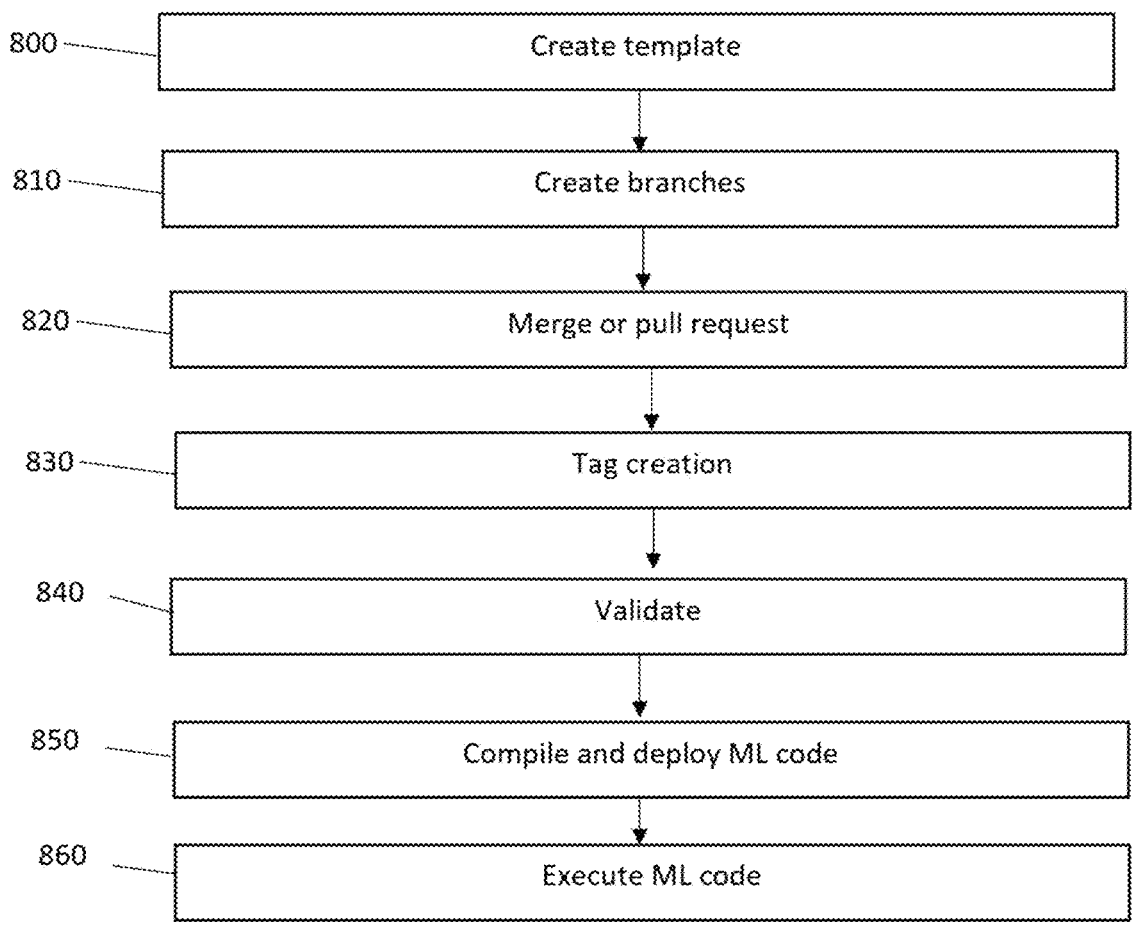
FIG. 8 is a flowchart of a method for creating a code repository structure for a ML model such as a NN, and guiding development of the ML model including enforcing structure and conventions of the development process, according to some embodiments.

Users may create feature branches based on a naming convention. The tag creation code (e.g., tag creation module 2) may check the PR details for feature branch name and put these details in the <feature_name> slot as per a naming tag name nomenclature or conventions. A set of example standard feature naming conventions to be included in the <feature_name> slot for Data Scientist or Machine Learning Engineers to follow when creating new feature branches includes (other names may be used):
1. Data_Ingestion
2. Exploratory_Data_Analysis
3. Data_Imputation
4. Data_Normalization
5. Feature_Curation
6. Feature_Engineering
7. Feature Selection
8. Hyper_Parameter_Tuning
9. Model_Training
10. Model_Validation
11, Model_Performance Evaluation
12. Model_Registration
13. Model_Scoring FIG. 8 is a flowchart of a method for creating a code repository structure for an ML model such as a NN, and guiding development of the ML model including enforcing structure and conventions of the development process, according to some embodiments. The operations of FIG. 8 may be performed by the systems shown in FIGS. 1 and 9, but other systems may be used.

Referring to FIG. 8, in operation 800, code or an automatic process such as a template creation module 5, may be executed to create a version control management platform (e.g. platform 60) template commit. The commit may include, for example a pipeline folder containing deploy files; a configuration folder containing key-value pairs describing variables used as input to the ML model; a notebooks folder; a steps folder containing ML code (e.g. steps folder 240); a tests folder comprising test scripts; and a utils folder.

In operation 810, code or an automatic process such as template creation module 5 may be executed to create version control management platform branches. Branches created may include, for example, a main branch; a develop branch branching from the main branch; a data science branch branching from the develop branch; a machine learning branch branching from the develop branch; and a quality assessment branch branching from the develop branch.

In operation 820, an ML developer may, after creating a portion of code for an ML system, make a merge or pull request to a version control management platform such as the Github platform.

In operation 830, code or an automatic process such as tag creation module 2 may be executed to create a tag associated with the merge or pull request. This may be performed in response to the merge or pull request, and/or in the event of a commit; the process to perform tag creation may be executed periodically, reacting to such events. The process may alter the version control management platform data such that the tag is displayed by the version control management platform in conjunction with data describing the branch associated with the pull request. Executing code to create the tag may include the process searching a commit history for a unique commit number associated with a pull request, and based on this search, creating a tag.

In operation 840, code or an automatic process such as a controller file or process 3 may be executed to validate files in one or more of the pipeline folder, configuration folder, notebooks folder, steps folder, a tests folder, and utils folder. This may be performed in response to the merge or pull request, or in the event of a commit. Such validation may include, for example one or more of determining whether or not files in the relevant folder exist; determining whether or not certain functions are contained within files in a relevant folder; and determining whether or not a function within a file in a relevant folder has a correct signature.

In operation 850, the ML model or code may be compiled and deployed. The processor performing operation 850 may be the same processor performing other operations, or a different processor; for example more than one processor or computer such as shown in FIG. 9 may be used, each performing different operations.

In operation 860, the deployed ML code may execute for example at an inference operation to produce output. The processor or computer performing operation 860 may be the same processor performing other operations, or a different processor or computer. For example, an ML system may be deployed to a system different than the system used to create it.

Other or different operations may be used.

Reference is made to FIG. 9, showing a high-level block diagram of an exemplary computing device according to some embodiments of the present invention. Computing device 900 may include a controller 905 that may be, for example, a central processing unit processor (CPU), graphics processing unit (GPU) or any other suitable multi-purpose or specific processors or controllers, a chip or any suitable computing or computational device, an operating system 915, a memory 920, executable code 925, a storage system 930, input devices 935 and output devices 940. Controller 905 (or one or more controllers or processors, possibly across multiple units or devices) may be configured to carry out methods described herein, and/or to execute or act as the various modules, units, etc. for example when executing code 925. More than one computing device 900 may be included in, and one or more computing devices 900 may be, or act as the components of, a system according to embodiments of the invention. Various components, computers, and modules of FIG. 1 may be or include devices such as computing device 900, and one or more devices such as computing device 900 may carry out functions such as those described in FIG. 8. For example modules, or functions of modules, such as tag creation module 2, template creation module 5, and other modules and functions, may be executed by or may be a computing device such as device 900.

Operating system 915 may be or may include any code segment configured to perform tasks involving coordination, scheduling, arbitration, controlling or otherwise managing operation of computing device 900, for example, scheduling execution of software programs or enabling programs, modules or units to communicate.

Memory 920 may be or may include, for example, a Random Access Memory (RAM), a read only memory (ROM), a Dynamic RAM (DRAM), a Flash memory, a volatile memory, a non-volatile memory, a cache memory, a buffer, a short term memory unit, a long term memory unit, or other suitable memory or storage units. Memory 920 may be or may include a plurality of, possibly different memory units. Memory 920 may be a computer or processor non-transitory readable medium, or a computer non-transitory storage medium, e.g., a RAM.

Executable code 925 may be executable code, e.g., an application, a program, a process, task or script. Executable code 925 may be executed by controller 905 possibly under control of operating system 915. For example, executable code 925 may configure controller 905 to manage or create branches, folders, tags, automatically create and manage a code repository structure, etc. and perform other methods as described herein. Although, for the sake of clarity, a single item of executable code 925 is shown in FIG. 9, a system according to some embodiments of the invention may include a plurality of executable code segments similar to executable code 925 that may be loaded into memory 920 or another non-transitory storage medium and cause controller 905, when executing code 925, to carry out methods described herein.

Storage system 930 may be or may include, for example, a hard disk drive, a CD-Recordable (CD-R) drive, a universal serial bus (USB) device or other suitable removable and/or fixed storage unit. Data such as commits, ML code, tags, etc. may be stored in storage system 930 and may be loaded from storage system 930 into memory 920 where it may be processed by controller 905. Some of the components shown in FIG. 9 may be omitted. For example, memory 920 may be a non-volatile memory having the storage capacity of storage system 930.

Input devices 935 may be or may include a mouse, a keyboard, a microphone, a touch screen or pad or any suitable input device. Any suitable number of input devices may be operatively connected to computing device 900. Output devices 940 may include one or more displays or monitors, speakers and/or any other suitable output devices. Any suitable number of output devices may be operatively connected to computing device 900. Any applicable input/output (I/O) devices may be connected to computing device 900 as shown by blocks 935 and 940. For example, a wired or wireless network interface card (NIC), a printer, a universal serial bus (USB) device or external hard drive may be included in input devices 935 and/or output devices 940.

Device 900 may include or may be, for example, a personal computer, a desktop computer, a laptop computer, a workstation, a server or cloud computer, a network device, or any other suitable computing device. A system as described herein may include one or more devices such as computing device 900.

Embodiments may improve MLOps technology, and thus ML technology itself and ML systems, for example, by reduction of development time, parallelism in development, adding automation to development, and standardization in development. Embodiments may increase effective collaboration and continuous feedback loops between ML development teams that help to make decisions faster and effective. Embodiments may replace the manual effort to track and manage the models with automated tag creation and enable users to identify model advancements in real-time with transparency. Embodiments may augment MLOps development with new standards by eliminating the time-consuming manual handovers and approvals. Embodiments may improve technology for efficiency and scalability; current MLOps tools are often not compatible with new MLOPS methodology.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for creating a code repository structure for a neural network, the method comprising:
   executing code to create a version control management platform template commit comprising a configuration folder comprising key-value pairs describing variables used as input to the neural network;; a steps folder comprising neural network code; and a tests folder comprising test scripts; and
   executing code to create a tag associated with a pull request and alter version control management platform data such that the tag is displayed in conjunction with data describing the branch associated with the pull request.

2. The method of claim 1, comprising executing code to create version control management platform branches, the branches comprising a main branch; a develop branch branching from the main branch; a data science branch branching from the develop branch; a machine learning branch branching from the develop branch; and a quality assessment branch branching from the develop branch.

3. The method of claim 1, wherein executing code to create a tag comprises searching a commit history for a unique commit number associated with a pull request, and based on this search creating a tag.

4. The method of claim 1, comprising, upon the event of a commit, executing a process to validate files in one or more of the configuration folder, steps folder, a tests folder, and utils folder.

5. The method of claim 4, wherein the validation comprises one or more of determining whether or not files in the relevant folder exist; determining whether or not certain functions are contained within files in a relevant folder; and determining whether or not a function within a file in a relevant folder has a correct signature.

6. The method of claim 1, comprising compiling and deploying the neural network.

7. The method of claim 1, comprising executing the neural network.

8. A system for creating a code repository structure for a neural network, the system comprising:
   a memory; and
   a processor configured to:

execute code to create a version control management platform template commit comprising a configuration folder comprising key-value pairs describing variables used as input to the neural network; a steps folder comprising neural network code; and a tests folder comprising test scripts; and execute code to create a tag associated with a pull request and alter version control management platform data such that the tag is displayed in conjunction with data describing the branch associated with the pull request.

9. The system of claim 8, wherein the processor is configured to execute code to create version control management platform branches, the branches comprising a main branch; a develop branch branching from the main branch; a data science branch branching from the develop branch; a machine learning branch branching from the develop branch; and a quality assessment branch branching from the develop branch.

10. The system of claim 8, wherein the processor is configured to execute code to create a tag comprises searching a commit history for a unique commit number associated with a pull request, and based on this search creating a tag.

11. The system of claim 8, wherein the processor is configured to, upon the event of a commit, execute a process to validate files in one or more of the configuration folder, steps folder, a tests folder, and utils folder.

12. The system of claim 11, wherein the validation comprises one or more of determining whether or not files in the relevant folder exist; determining whether or not certain functions are contained within files in a relevant folder; and determining whether or not a function within a file in a relevant folder has a correct signature.

13. The system of claim 8, comprising a processor configured to compile and deploy the neural network.

14. The system of claim 8, comprising a processor configured to execute the neural network.

15. A method for creating a development structure for an ML model, the method comprising:
executing code to create a version control management platform template commit comprising a folder comprising deploy files; a folder comprising key-value pairs describing variables used as input to the ML model; and a folder comprising ML model code; and executing code to create a tag associated with a pull request to be used in conjunction with data describing the branch associated with the pull request.

16. The method of claim 15, comprising executing code to create version control management platform branches, the branches comprising a main branch; a develop branch branching from the main branch; a data science branch branching from the develop branch; and a machine learning branch branching from the develop branch.

17. The method of claim 15, wherein executing code to create a tag comprises searching a commit history for a commit number associated with a pull request.

18. The method of claim 15, comprising, upon the event of a commit, executing a process to validate files in one or more of the folders.

19. The method of claim 18, wherein the validation comprises one or more of determining whether or not files in a folder exist; determining whether or not certain functions are contained within files in a relevant folder; and determining whether or not a function within a file in a relevant folder has a correct signature.

20. The method of claim 15, comprising executing the neural network.

* * * * *